US012333867B2

(12) United States Patent
Heiser et al.

(10) Patent No.: US 12,333,867 B2
(45) Date of Patent: Jun. 17, 2025

(54) INDEXING SENSOR DATA ABOUT THE PHYSICAL WORLD

(71) Applicant: Woven by Toyota, U.S., Inc., Palo Alto, CA (US)

(72) Inventors: Christopher Heiser, Campbell, CA (US); Jason Stinson, Campbell, CA (US); Anand Ramesh, Campbell, CA (US); Owen Davis, Campbell, CA (US); Khalid Azam, Campbell, CA (US); Trilok Agarwal, Campbell, CA (US); Harry Chan-Maestas, Campbell, CA (US); Stefan Gloutnikov, Campbell, CA (US); Kevin Phillips, Campbell, CA (US)

(73) Assignee: Woven By Toyota, U.S., Inc., Palo Alto, CA (US)

( * ) Notice: Subject to any disclaimer, the term of this patent is extended or adjusted under 35 U.S.C. 154(b) by 294 days.

(21) Appl. No.: 17/830,823

(22) Filed: Jun. 2, 2022

(65) Prior Publication Data

US 2022/0351553 A1 Nov. 3, 2022

Related U.S. Application Data

(63) Continuation-in-part of application No. PCT/US2022/023265, filed on Apr. 4, 2022.

(60) Provisional application No. 63/196,132, filed on Jun. 2, 2021, provisional application No. 63/196,119, filed on Jun. 2, 2021, provisional application No. 63/196,126, filed on Jun. 2, 2021, provisional
(Continued)

(51) Int. Cl.
 *G07C 5/00* (2006.01)
 *G06F 16/2457* (2019.01)
 *G06F 16/29* (2019.01)
 *G07C 5/08* (2006.01)

(52) U.S. Cl.
 CPC ......... *G07C 5/008* (2013.01); *G06F 16/2457* (2019.01); *G06F 16/29* (2019.01); *G07C 5/0816* (2013.01); *G07C 5/0841* (2013.01)

(58) Field of Classification Search
 CPC .... G07C 5/008; G07C 5/0816; G07C 5/0841; G06F 16/2457; G06F 16/29
 USPC ....................................... 701/31.4
 See application file for complete search history.

(56) References Cited

U.S. PATENT DOCUMENTS

2015/0317828 A1\* 11/2015 Isaksson ............ G06V 10/7515
 382/103
2021/0014323 A1\* 1/2021 Hayes .................... H04L 45/24

\* cited by examiner

*Primary Examiner* — Mahmoud S Ismail
(74) *Attorney, Agent, or Firm* — Christopher G. Darrow; Darrow Mustafa PC

(57) ABSTRACT

System, methods, and other embodiments described herein relate to improving data offloading in a mobile context by using indexes of the data to identify distributed devices that may include the data and selectively querying identified devices for the data. In one embodiment, a method includes, responsive to receiving a query for selected data stored among one or more distributed devices, identifying, by a query device, at least one target device of the distributed devices that matches the selected data using an index of vehicle data stored on the distributed devices. The method includes providing, by the query device, a request to the at least one target device to cause the at least one target device to retrieve the selected data stored locally at the target device. The method includes receiving the selected data from the target device. The method includes providing the selected data as an electronic output.

20 Claims, 6 Drawing Sheets

Related U.S. Application Data application No. 63/196,131, filed on Jun. 2, 2021, provisional application No. 63/170,291, filed on Apr. 2, 2021.

INDEXING SENSOR DATA ABOUT THE PHYSICAL WORLD

CROSS-REFERENCE TO RELATED APPLICATIONS

This application claims benefit of U.S. Provisional Application No. 63/196,119, filed on, Jun. 2, 2021, U.S. Provisional Application No. 63/196,126, filed on, Jun. 2, 2021, U.S. Provisional Application No. 63/196,131, filed on, Jun. 2, 2021, and U.S. Provisional Application No. 63/196,132, filed on, Jun. 2, 2021, which are herein incorporated by reference in its entirety. Additionally, the application is a continuation in part of PCT/US2022/023265 filed Apr. 4, 2022, which claims the benefit of U.S. Provisional Application No. 63/170,291, filed on Apr. 2, 2021, which are incorporated herein by reference.

TECHNICAL FIELD

The subject matter described herein relates, in general, to improving the offloading of vehicle data and, more particularly, to querying and selectively offloading selected vehicle data in a cloud-based system.

BACKGROUND

Modern vehicles produce exceptional amounts of data. Available means of communication and storage generally encounter difficulties when handling such massive amounts of data. That is, for example, available communication pathways, such as cellular networks, represent significant bottlenecks when offloading the sensor data from the vehicle, and while cloud-based systems could potentially handle the large amounts of raw data, communication and storage costs are significant when considering the amount that each separate vehicle generates, thereby causing difficulties when attempting to offload the sensor data.

The communication and storage problem is only exacerbated as more and more data collection systems come online in the form of computerized vehicles, smart systems, and internet-of-things devices. The massive amount of data and the asymmetrical design of existing networking systems mean that in addition to the difficulties with offloading the sensor data, central data systems would be burdened with significant storage and processing loads that are generally undesirable.

SUMMARY

In various embodiments, example systems and methods relate to a manner of improving data storage and offloading in a distributed system by using indexes of the data to identify distributed devices that may include the data and selectively requesting the data from the identified devices. As previously noted, a vehicle that is equipped with various sensors for automated driving and/or other purposes generates a large amount of sensor data. The sensor data includes valuable information about the physical world that is depicted therein. However, offloading the sensor data from the vehicle and providing the sensor data in a way that is useful represents significant difficulties because of the quantities of information and limitations on communication pathways and computing resources.

Therefore, in one or more embodiments, an inventive system is disclosed that improves the offloading and processing of the sensor data by utilizing capabilities of distributed devices in combination with a cloud-based resource to manage the distributed devices. For example, in one approach, a query system is a cloud-based resource that generates and maintains an index of the information stored by the distributed devices (e.g., vehicles and associated edge devices). In one arrangement, the index organizes metadata that describes the stored data, not the data itself, according to geography and collection time. Accordingly, the resulting index characterizes the underlying stored data according to contents of the stored data as characterized by the metadata, including the time and geography.

Thus, in one approach, the query system accepts queries that include search parameters identifying selected data. The search parameters specify the selected data that is to be retrieved from the distributed devices according to characteristics of the selected data as embodied by the metadata or combinations thereof. Accordingly, upon receiving a query, the query system searches the index to identify which of the distributed devices include the corresponding selected data. As a result, the query system identifies a set of target devices. The set of target devices may include a single device or a group of devices depending on the nature of the query. In any case, the query system then communicates a request to the identified set of target devices for the selected information. In one arrangement, the request includes the original search parameters. As such, the request causes the target devices to search the locally stored data for the selected data. In various configurations, the search parameters may specify additional aspects about the selected data, such as quality or additional characteristics that are not present in the index of the query system.

It should be appreciated that even though the query system may identify the selected data as being present on one or more of the distributed devices, the selected data may not be available or may not match as identified by the query system. Thus, the request induces the target devices to validate the request. When a target device identifies the selected data as being present, the target device extracts a segment of the stored data that includes the selected data so as to avoid sending information that is not pertinent to the request. The target device can then communicate an optimized segment to the query system to fulfill the request. Once received, the query system then provides the selected data to the requestor to fulfill the original query. In this way, the system improves the use of the sensor data by providing an efficient mechanism for search and retrieval of the information without encountering difficulties with offloading and storing large amounts of data.

In one embodiment, a query system is disclosed. The query system includes one or more processors and a memory communicably coupled to the one or more processors. The memory stores instructions that, when executed by the one or more processors, cause the one or more processors to, responsive to receiving a query for selected data stored among one or more distributed devices, identify at least one target device of the distributed devices that matches the selected data using an index of vehicle data stored on the distributed devices. The instructions include instructions to provide a request to the at least one target device to cause the at least one target device to retrieve the selected data stored locally at the target device. The instructions include instructions to receive the selected data from the target device. The instructions include instructions to provide the selected data as an electronic output.

In one embodiment, a non-transitory computer-readable medium including instructions that, when executed by one or more processors, cause the one or more processors to perform one or more functions is disclosed. The instructions include instructions to, responsive to receiving a query for selected data stored among one or more distributed devices, identify at least one target device of the distributed devices that matches the selected data using an index of vehicle data stored on the distributed devices. The instructions include instructions to provide a request to the at least one target device to cause the at least one target device to retrieve the selected data stored locally at the target device. The instructions include instructions to receive the selected data from the target device. The instructions include instructions to provide the selected data as an electronic output.

In one embodiment, a method is disclosed. In one embodiment, the method includes, responsive to receiving a query for selected data stored among one or more distributed devices, identifying, by a query device, at least one target device of the distributed devices that matches the selected data using an index of vehicle data stored on the distributed devices. The method includes providing, by the query device, a request to the at least one target device to cause the at least one target device to retrieve the selected data stored locally at the target device. The method includes receiving, by the query device, the selected data from the target device. The method includes providing the selected data as an electronic output.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
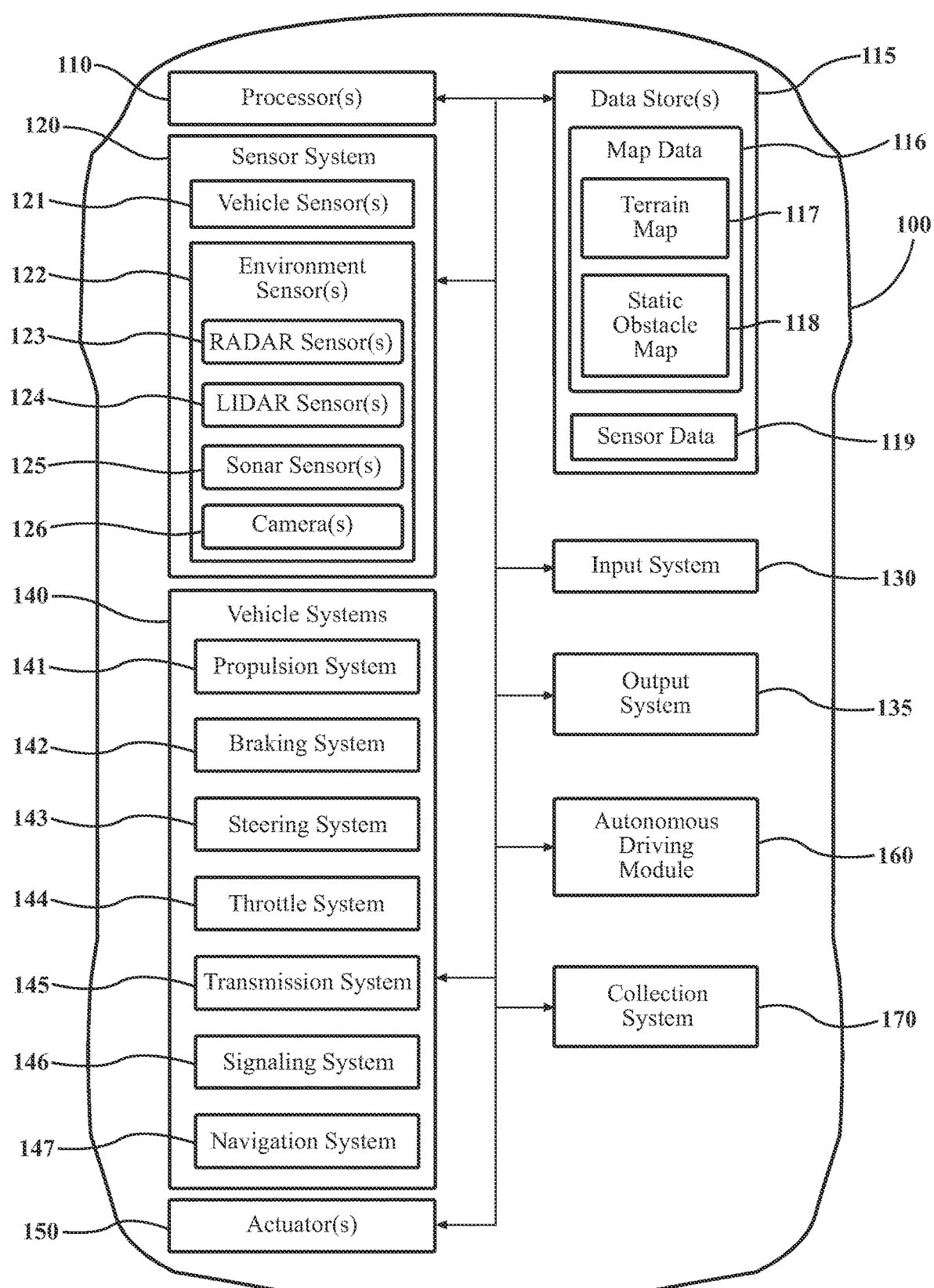
FIG. 1 illustrates one embodiment of a vehicle within which systems and methods disclosed herein may be implemented.

Systems, methods, and other embodiments are disclosed that are associated with a manner of improving data offloading in a mobile context by using indexes of the data to identify distributed devices that may include the data and selectively requesting the data from the identified devices. As previously noted, a vehicle that is equipped with various sensors for automated driving and/or other purposes generates a large amount of sensor data. In some examples, such vehicles can generate 5 TB/hr of sensor data and other data, such as processed information about the sensor data. The data includes valuable information about the physical world that is depicted therein. However, offloading the data from the vehicle and providing the data in an ingestible form represents significant difficulties because of limitations on communication pathways and computing resources.

Therefore, in one or more embodiments, a collection system and a query system are disclosed. The collection system functions to improve the offloading and processing of the sensor data by utilizing the capabilities of edge-based devices to perform the offloading and processing. Using the edge devices that are close to the source (e.g., close to the vehicles) avoids communication bottlenecks since direct physical connections or robust wireless connections are more feasible. Additionally, the edge devices can focus computing resources on a smaller set of data associated with a set of vehicles that offload to the device, thereby avoiding extensive use of computing resources in the cloud.

For example, in one approach, the collection system is integrated with a charging station or is otherwise associated with an edge-based device at a location where the vehicle may park for extended periods of time (e.g., a home, office, parking garage. Etc.). Whichever location is utilized, the collection system is generally integrated with an edge-based device that has the ability to store and process the data and do so for at least a single vehicle. Accordingly, the system offloads and locally stores the raw data from the vehicle. Then, the system can execute various applications, such as machine learning models, analytics, and so on, over the sensor data to derive additional content. The additional content can take various forms and is not generally limited but may include machine perceptions (e.g., object identification, scene recognition/correlation, and so on) and other information derived from the sensor data.

Moreover, the collection system may also receive derivations with the raw data generated by the vehicle itself. That is, the vehicle may originally generate the data and process the data to, for example, perceive aspects of the surrounding environment. These perceptions may take different forms, such as object instance identification, semantic segmentation of a perceived scene, trajectory estimation, and so on. In still further aspects, the perceptions may include more complex determinations, such as vehicle behavior recognition, scenario identification, and so on. Accordingly, the vehicle can provide these derivations along with the sensor data to further enrich the sensor data and avoid redundant processing for the same determinations. The vehicle may then include, in various arrangements, annotations and/or other layers of metadata along with the sensor data that further characterize the contents of the sensor data.

Once offloaded from the vehicle, the system indexes the sensor data according to attributes of the sensor data itself and the derived content generated from both the vehicle and the collection system. The collection system uses the attributes, which are generally time and location information indicating when and where respective segments of the sensor data have been acquired, to originally index the sensor data. The system can then further update the index using the derived content by correlating the time location information with annotations about the derived content. Thereafter, the system provides the index, including information about the sensor data, but not the data itself, to a cloud-based device, such as the query system. The cloud-based device functions to aggregate indexes from distributed devices within various geographic locations, thereby generating a catalog (i.e., an aggregated/combined index) of collected sensor data from a broad selection of vehicles. In this way, the collection system improves the use of the sensor data to provide an index about observed areas of the physical world.

With attention to the query system, in one or more embodiments, the query system improves the offloading and processing of the sensor data by utilizing capabilities of the distributed devices in combination with the index. For example, in one approach, the query system is a cloud-based resource that generates and maintains the index of the information stored by the distributed devices (e.g., vehicles and associated edge devices). In one arrangement, the index organizes metadata that describes the stored data, not the data itself, according to geography and collection time. Accordingly, the resulting index characterizes the underlying stored data according to the contents of the stored data as characterized by the metadata, including the time and geography.

Thus, in one approach, the query system accepts queries that include search parameters identifying selected data. The search parameters specify the selected data that is to be retrieved from the distributed devices according to characteristics of the selected data as embodied by the metadata or combinations thereof. Accordingly, upon receiving a query, the query system searches the index to identify which of the distributed devices could include the corresponding selected data. As one example, the query may specify a broad category for the selected data, such as all observations of four-way stops with at least two vehicles present. As a result, the query system identifies a set of target devices that may include many different vehicles as identified by the metadata in the index. Alternatively, the query may be more specifically directed to a specific four-way stop at a particular time of day in which case the resulting may indicate a single target device.

In any case, the query system then communicates a request to the identified set of target devices for the selected data. In one arrangement, the request includes the original search parameters. As such, the request causes the target devices to search the locally stored data for the selected data. In various configurations, the search parameters may specify additional aspects about the selected data, such as quality or additional characteristics that are not present in the index of the query system, and instead the target devices verify conformance with the search parameters prior to responding with the selected data. Accordingly, the target devices confirm the determination of the query system and whether locally stored data matches the original query.

When a target device identifies the selected data as being present, the target device extracts a segment of the stored data that includes the selected data so as to avoid sending information that is not pertinent to the request. The particular process of extraction may vary but generally includes extracting individual frames from video, segments of radar/LiDAR, and other pieces of the stored data that specifically relate to the request. In various approaches, the request may include additional parameters for defining an extent of the data that is to be provided. For example, the request may specify to provide +/−2 s of video around a requested clip. However, in general, the query system functions to limit the amount of data that is to be offloaded and generally requests the pertinent data for the query.

The target device can then communicate an optimized segment to the query system to fulfill the request. Once received, the query system then provides the selected data to the requestor to fulfill the original query. Providing the selected data may include various actions, such as display, communicating, and/or additional processing that provides the data in a usable form to the requestor. In this way, the system improves the use of the sensor data by providing an efficient mechanism for search and retrieval of the information without encountering difficulties with offloading and storing large amounts of data.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles and edge devices, it will be understood that embodiments are not limited to these devices. In some implementations, a collection system 170 may be implemented within any device that, for example, collects sensor data about the physical world. In various approaches, the vehicle 100 may be an automated vehicle. As used herein, an automated vehicle refers to a vehicle with at least some automated driving functions. Thus, the vehicle 100 may operate autonomously, semi-autonomously, or with the assistance of various advanced driving assistance systems (ADAS). Further, the vehicle 100, in at least one arrangement, is a connected vehicle that is capable of communicating wirelessly with other devices, such as other connected vehicles, infrastructure elements (e.g., roadside units, edge devices, etc.), cloud-computing elements, and so on. Moreover, while the present disclosure is generally described in relation to the vehicle 100, in yet further approaches, the noted systems and methods disclosed herein may be implemented as part of other entities, such as electronic devices that are not associated with a particular form of transport but are instead embedded as part of a mobile electronic device that can be, for example, carried by an individual and that may function independently or in concert with additional systems (e.g., sensors) of other devices.

In any case, the vehicle 100 also includes various elements. It will be understood that, in various embodiments, it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed collection system 170 can be implemented within the vehicle 100, while further components of the collection system 170 are implemented within edge-based devices, as discussed further subsequently.

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a collection system 170 that is implemented to perform methods and other functions as disclosed herein relating to collecting, processing, and indexing of sensor data collected by the vehicle 100. As previously noted, while the collection system 170 is shown as being a component of the vehicle 100, the present disclosure envisions the collection system 170 as being implemented as separate distinct instances within different devices, including but not limited to edge devices, such as micro-datacenters, RSUs, charging stations, etc. In general, such devices may be located anywhere that a vehicle parks for an extended period.

Thus, these devices may be located at homes, offices, integrated with charging stations, within parking garages, and so on. In general, the collection system 170 associated with an edge device that is at a static location is, for example, configured with additional storage to handle large quantities of data while also providing further resources in the form of processing resources to execute applications over offloaded sensor data and generate additional derived content. It should be appreciated that the collection system 170, in various implementations, is generally distinct from a query system, as discussed further subsequently. However, in one or more arrangements, the collection system, and the query system share one or more components.

Moreover, the collection system 170, as provided for within the vehicle 100, functions in cooperation with a communication system. In one embodiment, the communication system communicates according to one or more communication standards. For example, the communication system can include multiple different antennas/transceivers and/or other hardware elements for communicating at different frequencies and according to respective protocols, whether wired or wireless. The communication system, in one arrangement, communicates via a communication protocol, such as a WiFi, DSRC, V2I, V2V, or another suitable protocol for communicating between the vehicle 100 and other entities, such as an edge device. Moreover, the communication system, in one arrangement, further communicates according to a protocol, such as the global system for mobile communication (GSM), Enhanced Data Rates for GSM Evolution (EDGE), Long-Term Evolution (LTE), 5G, or another communication technology that provides for the vehicle 100 communicating with various remote devices. In any case, the collection system 170 can leverage various communication technologies to provide communications to other entities and/or received information from other entities.

Figure 2:
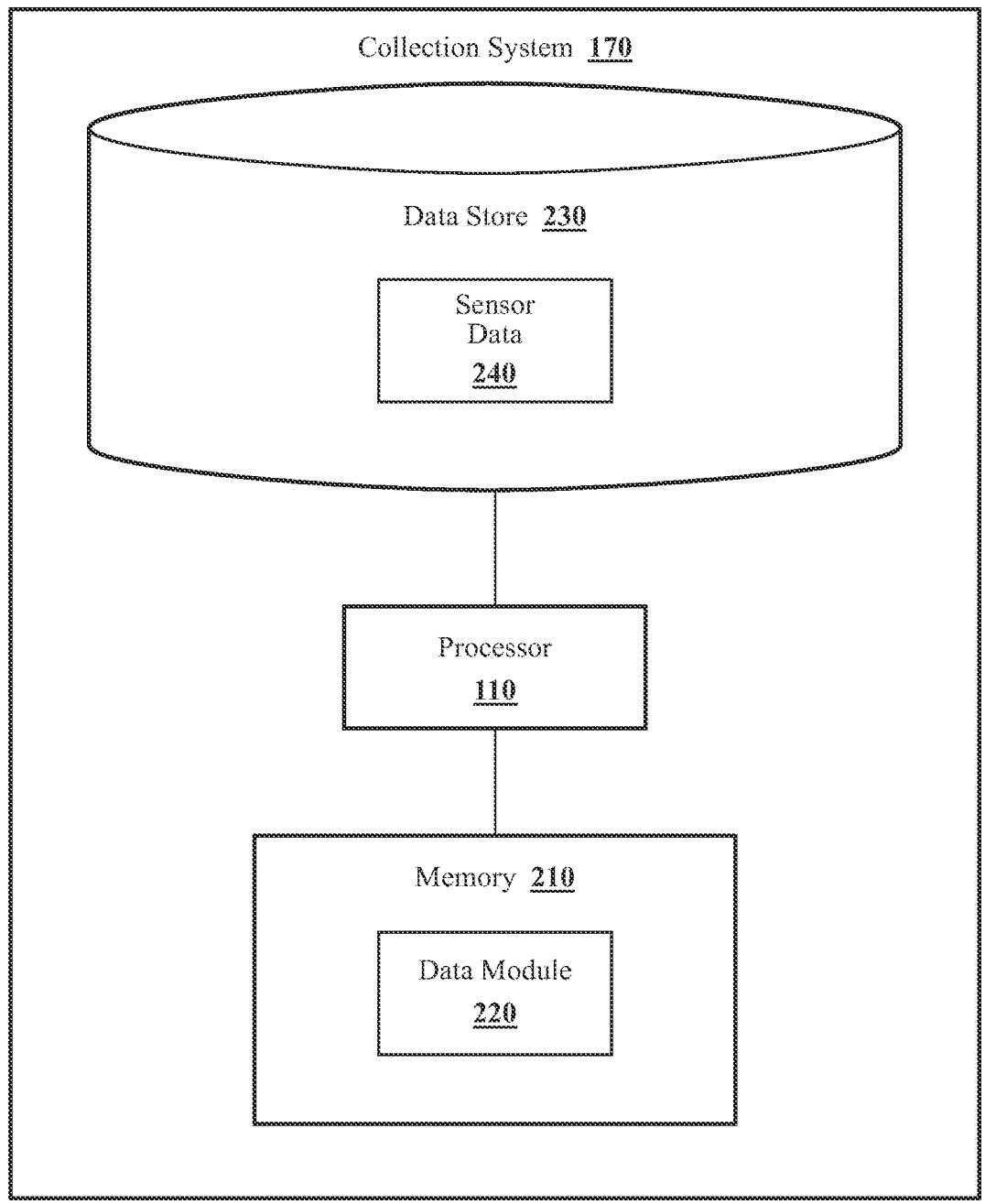
FIG. 2 illustrates one embodiment of a collection system associated with improving the indexing of sensor data.

With reference to FIG. 2, one embodiment of the collection system 170 is further illustrated. The collection system 170 is shown as including a processor 110 from the vehicle 100 of FIG. 1. Accordingly, the processor 110 may be a part of the collection system 170, the collection system 170 may include a separate processor from the processor 110 of the vehicle 100 or the collection system 170 may access the processor 110 through a data bus or another communication path. In further aspects, the processor 110 is a cloud-based resource. Thus, the processor 110 may communicate with the collection system 170 through a communication network or may be co-located with the collection system 170. In one embodiment, the collection system 170 includes a memory 210 that stores a data module 220. The memory 210 is a random-access memory (RAM), read-only memory (ROM), a hard-disk drive, a flash memory, or other suitable memory (either volatile or non-volatile) for storing the data module 220 and/or other information used by the collection system 170. The data module 220 is, for example, computer-readable instructions within the physical memory 210 that, when executed by the processor 110, cause the processor 110 to perform the various functions disclosed herein.

Continuing with FIG. 2 and a general embodiment of the collection system 170, in one or more arrangements, the collection system 170 includes a data store 230. The data store 230 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes the sensor data 240 along with other information that is used by the module 220. It should be appreciated that while the data store 230 is shown as including the sensor data 240, separate instances of the collection system 170 may implement the data store 230 to include additional sets of information, such as metadata associated with the sensor data 240, including derived content from automated systems of the vehicle 100 and/or derived content from applications executed by the processor 110 when implemented at an edge device.

In any case, the data module 220 includes instructions that function to control the processor 110 to acquire the sensor data 240 about a surrounding environment of the vehicle 100 when implemented as part of the vehicle 100. The collection system 170 captures observations of the surrounding environment in the form of the sensor data 240 that the vehicle 100 (e.g., via automated driving module 160) processes into determinations about the surrounding environment, including identification of objects and aspects of the environment (e.g., vehicles, pedestrians, roadways, lane configurations), trajectories of objects, operating states of traffic signals and traffic associated with the roadways, semantic classes of identified aspects, and so on. In general, the collection system 170 within the vehicle 100 may acquire any information generated by the vehicle 100 as being complementary to the sensor data 240. Thus, the sensor data 240 is not limited to including only observations from cameras, LiDAR, radar, and similar sensors about the surrounding environment but can also include general telematics data about the operation of the vehicle 100. For example, the sensor data 240 can include dynamics information about the vehicle 100 (e.g., pitch, yaw, roll, speed, etc.), engine data, driver control inputs (e.g., steering angle, accelerator percent, etc.), and so on. In yet a further aspect, the sensor data 240 includes information about the interior passenger cabin of the vehicle 100, such as camera images, locations of passengers, infotainment settings/use, and so on. This information is accompanied by general metadata that includes a timestamp along with geographic information specifying a location of the vehicle 100 when the sensor data 240 was collected.

The data module 220, in one arrangement, controls respective sensors of the vehicle 100 to provide the data inputs in the form of the sensor data 240. The data module 220 may further process the sensor data 240 into separate observations of the surrounding environment. For example, the data module 220, in one approach, fuses data from separate sensors to provide an observation about a particular aspect of the surrounding environment. By way of example, the sensor data 240 itself, in one or more approaches, may take the form of separate images, radar returns, LiDAR returns, and so on. The data module 220 may derive determinations (e.g., location, pose, characteristics, etc.) from the sensor data 240 and fuse the data for separately identified aspects of the surrounding environment, such as surrounding vehicles, pedestrians, and so on. The data module 220 may further extrapolate the sensor data 240 into an observation by, for example, correlating the separate instances of sensor data into a meaningful observation about an object beyond an instantaneous data point. For example, the data module 220 may track a pedestrian over many data points to provide an indication of actions in relation to various objects, such as a vehicle, a shopping cart, etc., to provide information about whether an object is moving or performing some specific action (e.g., parking in a parking space).

Additionally, while the data module 220 is discussed as controlling the various sensors to provide the sensor data 240, in one or more embodiments, the module 220 can employ other techniques that are either active or passive to acquire the sensor data 240. For example, the data module 220 may passively sniff the sensor data 240 from a stream of electronic information provided by the various sensors or other modules/systems in the vehicle 100 to further components within the vehicle 100. Moreover, as noted, the data module 220 or other components of the vehicle 100 (e.g., module 160) can undertake various approaches to fuse data from multiple sensors when providing the sensor data 240. Thus, the sensor data 240, in one embodiment, represents a combination of perceptions acquired from multiple sensors.

Of course, depending on the sensors that the vehicle 100 includes, the available sensor data 240 that the collection system 170 can harvest may vary. As one example, according to a particular implementation, the vehicle 100 may include different types of cameras or placements of multiple cameras. When acquiring the sensor data 240, the data module 220 may acquire various electronic inputs that originate from the vehicle 100, which may be stored in the data store 230 of the collection system 170 as the sensor data 240 and processed according to various algorithms, such as machine learning algorithms, heuristics, and so on by one or more additional systems of the vehicle 100. Accordingly, the collection system 170, in one approach, maintains the sensor data 240 along with information derived therefrom in the data store 230.

As previously noted, this information can be significant in quantity. Accordingly, in further arrangements, the data module 220 may store the sensor data 240 for a limited time (e.g., according to available space and first-in-first-out). In yet further aspects, the data module 220 may down-sample or selectively store information, such as by skipping video frames, LiDAR frames, and so on. In any case, the collection system 170 stores a plurality of information acquired by the vehicle 100 and further offloads the information when a suitable connection with an edge device is available.

Figure 3:
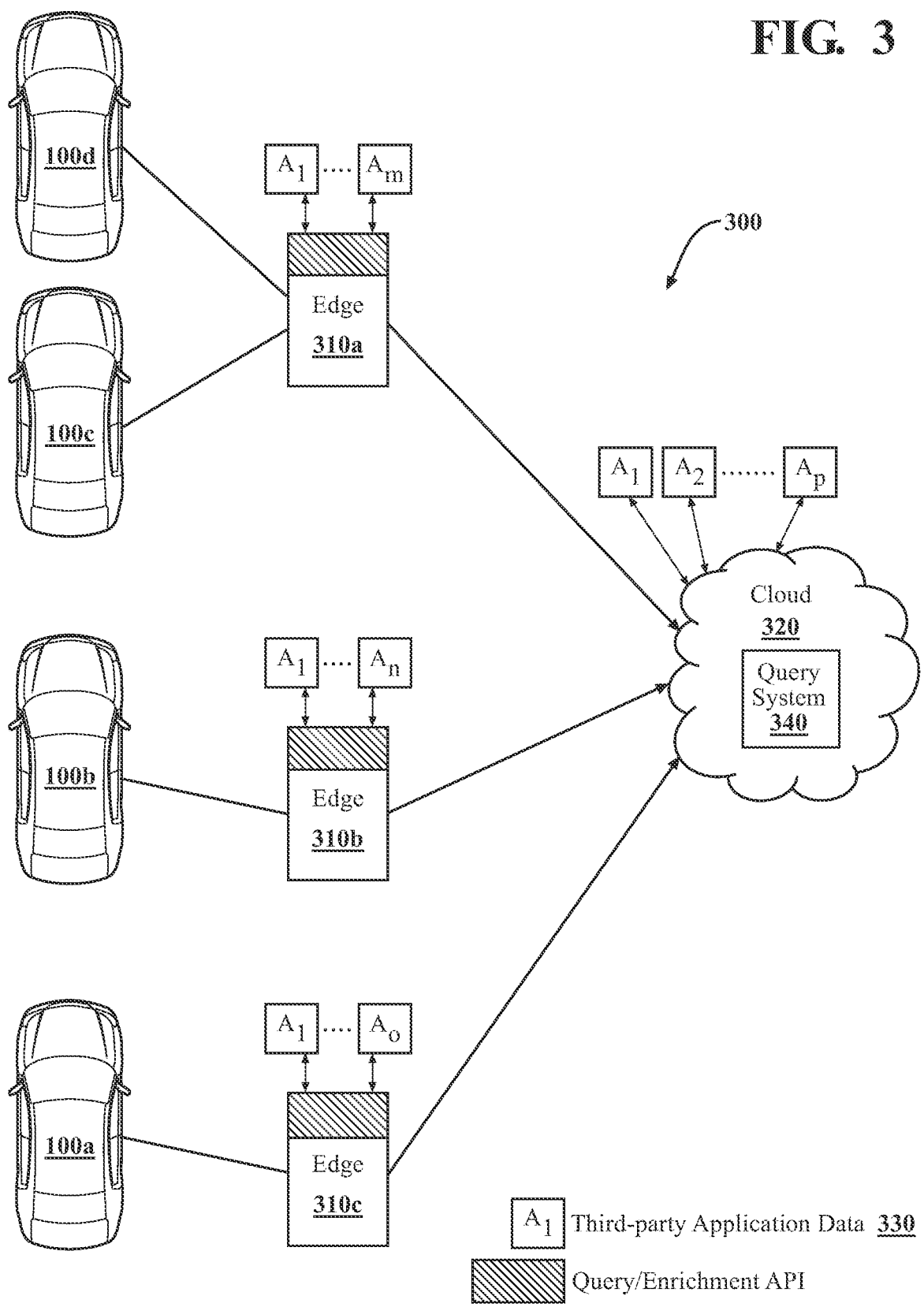
FIG. 3 illustrates a diagram of a network including various components that implement the systems and methods discussed herein.

As a further explanation of the overall architecture of the current approach, consider FIG. 3. FIG. 3 shows a network architecture 300 of various devices. In particular, the network architecture 300 shows relationships between vehicles 100*a-d*, edge 310*a-c*, and a cloud 320. The vehicles 100*a-d* are representative of devices that acquire sensor data to be collected at the edges 310*a-c*, which are edge devices. As previously noted, the vehicles 100*a-d* may include devices other than vehicles, such as drones, robots, and other devices that collect information about the physical world that may be useful for subsequent analysis and querying. Further, the separate edges 310*a-c* may be associated with different fleets of vehicles. In any case, the collection system 170 is separately embedded as unique instances with the edges 310*a-c* to collect information from the vehicles 100*a-d* and provide indexes of the collected data to the cloud 320 and a query system 340 where the indexes are aggregated into a catalog of available data about the physical world as encountered and perceived by the vehicles 100*a-d*. In this way, the query system 340 can generate the index as an efficient point of entry to identify data that is of interest.

To offload the sensor data 240 to a collection system 170 of an edge device, the vehicle 100 and the collection system 170 of the edge device establish a connection after the detection of an offload event. In general, the offload event is an occurrence of a condition that indicates the presence of the vehicle 100 at the edge device and the data on the vehicle 100 that is to be offloaded. Thus, as one example, the vehicle 100, which may be an electric vehicle, physically connects with a charging station, which may further include a data connection. Upon sensing the establishment of the connection, the collection system 170 of the charging station may, for example, query the collection system of the vehicle 100 about whether data is present to be offloaded. In general, the particular protocol may vary, but the vehicle 100 and the edge device function to establish a connection and determine that data is to be uploaded as the offload event. Accordingly, when this occurs, the collection system 170 of the edge device determines that the condition for the offload event is satisfied and proceeds to acquire the sensor data 230 from the vehicle 100.

Once the collection system 170 of the edge device acquires the sensor data 240, the data module 220 indexes the sensor data 240 according to attributes of the sensor data 240. In one arrangement, the attributes include time and location associated with respective segments of the sensor data 240. Additionally, it should be appreciated that the vehicle 100 can offload metadata and derivations about the sensor data 240 generated by the vehicle 100 in addition to the sensor data 240 itself. That is, while the sensor data 240 is discussed as being offloading, the sensor data 240 can further include the information derived by the module 160, telematics data, and other information accumulated by the vehicle 100. In any case, indexing the sensor data 240, in this way, serves as a baseline index of the sensor data 240 in order to provide a general entry point according to the attributes into the sensor data 240 itself. Once the sensor data 240 is uploaded to the collection system 170, the data module 220 further processes the sensor data 240 to derive added content.

With reference to FIG. 3, the edge devices 310*a-c* are shown with various third-party applications 330. The applications 330 may interact with the sensor data 240 via various application programming interfaces (APIs) that are, in one arrangement, integrated as part of the data module 220 to facilitate analysis of the sensor data 240. In any case, the applications 330 can generally include a wide variety of models, heuristics, or other mechanisms for analyzing the sensor data 240. The separate edges 310*a-c* may include any number of the applications 330, which may vary at the respective edge devices according to applications associated with particular geographic locations or use cases for the vehicles that interact with a respective edge device. As one example, the applications 330 can include machine learning models, statistical analysis applications, and so on. The applications 330 function to process the sensor data 240 and provide derived added content, such as machine perception, pattern recognition, and so on. Accordingly, the applications 330 output the derived added content as an additional layer of the sensor data 240.

The data module 220 can then update the index according to the derived added content in order to further enrich the index with information about the sensor data 240. This added information can be included as simple tags, annotations, or other indicators that are generally relatively small compared to the sensor data 240 represented by the information. Accordingly, the resulting index provides information about the sensor data 240 correlated by time and location. This information is provided in place of the sensor data 240 itself, thereby avoiding bottlenecks with communicating large quantities of information while permitting querying of the data by the query system 340. This subsequent querying provides for retrieval of the sensor data 240 from the edge devices so that entities can identify segments of the data that is of interest and retrieve only the segments for further analysis or general use. In this way, the collection system 170 and the query system 340 improve the storage, indexing, and subsequent use of the sensor data while avoiding difficulties with communication and processing bottlenecks.

Figure 4:
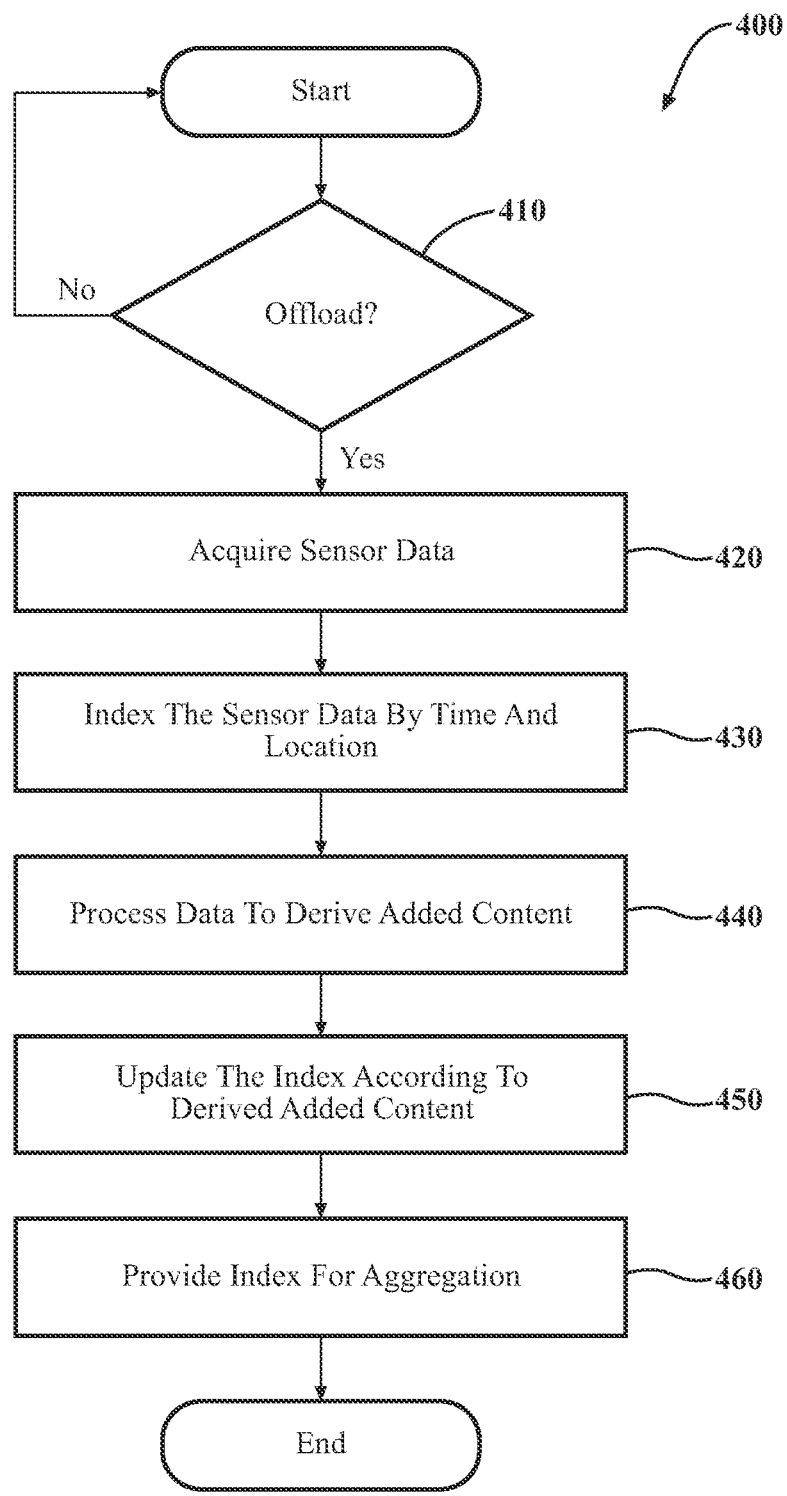
FIG. 4 is a flowchart illustrating one embodiment of a method associated with indexing sensor data at an edge device.

Additional aspects about storing and indexing sensor data at edge devices will be described in relation to FIG. 4. FIG. 4 illustrates a flowchart of a method 400 that is associated with indexing sensor data at an edge device. Method 400 will be discussed from the perspective of the collection system 170 of FIG. 2 as implemented by an edge device. While method 400 is discussed in combination with the collection system 170, it should be appreciated that the method 400 is not limited to being implemented within the collection system 170 but is instead one example of a system that may implement the method 400. Furthermore, while the method is illustrated as a generally serial process, various aspects of the method 400 can execute in parallel to perform the noted functions.

At 410, the data module 220 determines whether an offload event has been satisfied. For example, the data module 220 determines the presence of a vehicle for offloading data by detecting an electronic communication that is in response to a beacon, is part of an electronic handshake, or is otherwise directed to the collection system 170 to indicate the presence of the vehicle for offloading. As previously mentioned, the offload event can include a series of communications that form a handshake or other protocol. This may involve exchanging parameters to negotiate aspects of the offload (e.g., speed, data quantity, etc.). In any case, the offload event generally includes detecting that the vehicle 100 is within proximity of the edge device, establishing a connection for communicating, and then initiating the offload of the sensor data 240. Of course, in implementations where the vehicle 100 itself includes the collection system 170, then the collection system 170 may proceed without a determination of proximity.

At 420, the data module 220 acquires the sensor data 240 from the vehicle 100 and stores the sensor data locally at the edge device. The process of acquiring the sensor data 240 includes, in one or more arrangements, receiving the sensor data 240 via a communication pathway, such as via a wired or wireless communication link. The data module 230 receives the sensor data 240 and stores the sensor data 240 locally within the data store 230. As previously noted, the sensor data 240 acquired by the collection system 170 can include the raw data from the sensors and, in various approaches, additional information derived from and about the sensor data 240. That is, the sensor data 240 can be communicated along with metadata describing characteristics of the sensor data 240 itself and additional derived content that is generated by the vehicle 100 from the sensor data 240. In further aspects, data module 220 can selectively sample the sensor data 240 to compress the sensor data 240 for storage. The data module 220 may undertake the compression when the sensor data 240 is initially received or at a subsequent time, such as after further processing as discussed at block 440. In yet further embodiments, sensor data 240 is stored without compression. In any case, the sensor data 240 is offloaded or otherwise removed from the vehicle 100 and retained at the edge device.

At 430, the data module 220 generates an index of the sensor data 240. In one approach, the data module 230 uses attributes about how the sensor data 240 was acquired to serve as references in the index. The attributes can include different aspects relating to the sensor data 240 but generally include time and geographic location as these aspects generally correlate as the vehicle 100 progresses along a route. Thus, the index makes the sensor data 240 searchable according to time/location. The data module 220 can further populate the index with derived information produced by the vehicle 100. As previously outlined, this information can include information from automated driving systems, telematics data, safety control systems, and so on. Therefore, the initial index functions as a general index over the sensor data 240 to correlate the sensor data 240 with identifying elements so that particular segments of the sensor data 240 can be specifically referenced.

At 440, the data module 220 processes the sensor data 240 to derive added content. In particular, the data module 220 analyzes the sensor data 240 to derive additional content using at least a model or other application. The model/application can be a native integrated application of the collection system 170 or may be a third-party application. That is, the collection system 170 supports access by third-party applications through exposure of an API that facilitates access and processing of the sensor data 240. This permits a diverse set of different applications to process the sensor data 240 and derive additional content, thereby providing a richer set of information for subsequent querying. It should be appreciated that the additional content is generally described as derived perceptions of the surrounding environment of the vehicle 100, such as a presence of objects, locations of the objects, types of the objects, and relationships between the objects; however, the additional content may take many different forms including deriving patterns of behaviors (e.g., traffic behaviors, driving behaviors, driver tendencies, etc.), statistical correlations, and so on.

At 450, the data module 220 updates the index using the additional content. Updating the index provides for further indicating characteristics of the sensor data 240 relative to the attributes (i.e., time and location). This further characterization provides additional layers of information for querying in order to identify specific segments of the sensor data 240 that may be relevant to a particular query/request. In general, the data module 220 updates the index by correlating the additional content with the sensor data 240 in the index according to the time and the location of the respective segments associated with the additional content. Moreover, the derived contents may further indicate the characteristics that define scenarios associated with a combination of objects, locations of the objects, and a roadway context. In general, the scenarios may be specifically derived indicators about the sensor data 240 from the applications further processing the sensor data 240 and/or analysis by one or more applications of the derived content itself to identify patterns within the derived content (e.g., a presence of a pedestrian and another vehicle at an intersection). Similarly, the roadway context may be identified by the applications and can include particular configurations of a roadway in combination with the presence of different objects, weather conditions, and so on. As one example, a roadway context may define a particular type of turn (e.g., left turn) with the presence of traffic, relative speed limits of roads, day/night conditions, and so on. While the various contexts and scenarios are described, it should be appreciated that the scope of information that can be indexed is not limited to the discussed examples, but can further include other combinations, such as vehicle behavior, vehicles with particular configurations, and so on. In this way, the data module 220 can embed information into the index without including the sensor data itself to provide a high-resolution as to the contents of the sensor data 240 when searching.

At 460, the data module 220 provides the index to the query system 340 as a report about contents of the sensor data 240. As noted previously, the query system 340 is generally a cloud-based resource that aggregates the indexes from many different edge-based devices into a common catalog of all available sensor data among the population of distributed devices. In one or more approaches, the collection system 170 communicates the index to the cloud via a wired or wireless communication link. Communicating the index instead of the sensor data 240 avoids transferring a considerable amount of data and, thereby, avoids bottlenecks associated with a communication link and added costs of bandwidth in transferring the data while still providing information via the index that can be searched to identify aspects of the sensor data that may be of interest. In this way, the collection system 170 improves storage and use of sensor data collected by vehicles that are broadly distributed across geographic areas.

As an additional aspect, the collection system 170 further supports searching of the sensor data via the index. As will be discussed in greater detail with respect the query system 340, in various implementations, a search may be generated at the cloud and executed over the aggregated catalog of indexes. The search may specify particular parameters, such as a date range, a particular geographic location, and/or specific aspects of the sensor data itself as embodied by the information included within the index. Accordingly, an instance of the query system 340 executing in the cloud 320 determines from the catalog which of the distributed devices correspond with the information that matches the search. The query system 340 can then communicate the search to the specific matching target devices. At the target devices, the query is further executed over the local index to identify the segments of information stored thereon. The target device can then communicate the matching sensor data back to the query system 340, which may involve communicating the information as a whole or a down-sampled version to conserve bandwidth. Whichever approach is undertaken, the overall system has effectively focused the use of particular segments of data without encountering issues with offloading all of the data to the cloud, thereby improving efficiency.

Figure 5:
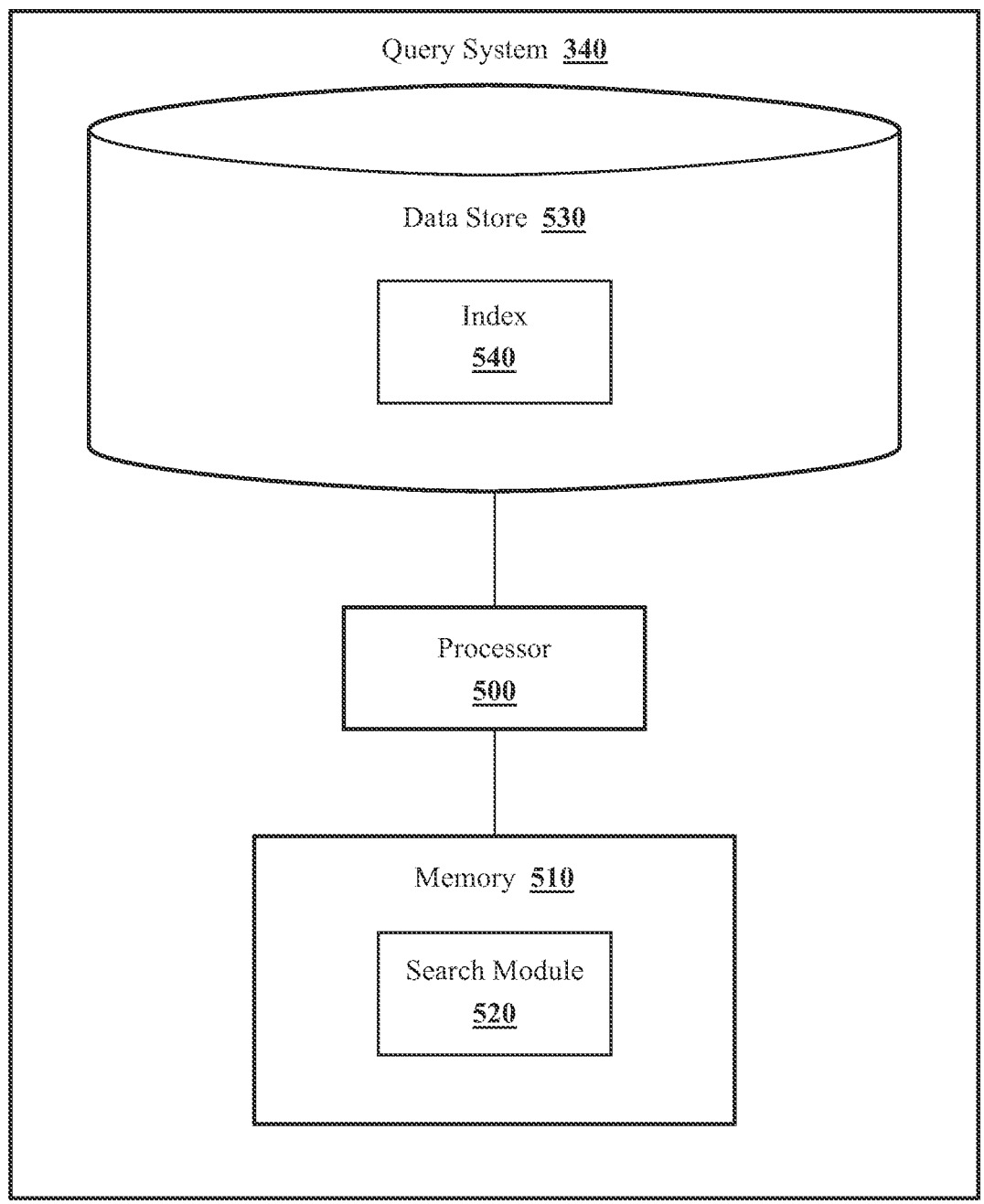
FIG. 5 illustrates one embodiment of a query system associated with querying and selectively offloading data from distributed devices.

With reference to FIG. 5, aspects of the cloud-based query system 340 will now be described. As shown in FIG. 5, one embodiment of the query system 340 is further illustrated. The query system 340 is shown as including a processor 500 from the vehicle 100 of FIG. 1. Accordingly, the processor 500 may be a part of the query system 340, the query system 340 may include a separate processor from the processor 500 of the vehicle 100 or the query system 340 may access the processor 500 through a data bus or another communication path. In further aspects, the processor 500 is a cloud-based resource. Thus, the processor 500 may communicate with the query system 340 through a communication network or may be co-located with the query system 340. In one embodiment, the query system 340 includes a memory 510 that stores a search module 520. The memory 510 is a random-access memory (RAM), read-only memory (ROM), a hard-disk drive, a flash memory, or other suitable memory (either volatile or non-volatile) for storing the search module 520 and/or other information used by the query system 340. The module 520 is, for example, computer-readable instructions within the physical memory 510 that, when executed by the processor 500, cause the processor 500 to perform the various functions disclosed herein.

Continuing with FIG. 5 and a general embodiment of the query system 340, in one or more arrangements, the query system 340 includes a data store 530. The data store 230 is, in one embodiment, an electronic data structure (e.g., a database) stored in the memory 510 or another electronic memory and that is configured with routines that can be executed by the processor 500 for analyzing stored data, providing stored data, organizing stored data, and so on. Thus, in one embodiment, the data store 530 stores data used by the module 520 in executing various functions. In one embodiment, the data store 530 includes an index 540 along with other information that is used by the module 520. It should be appreciated that while the data store 530 is shown as including the index 540, the index 540 may be distributed across multiple instances of the query system 340 within a distributed computing system.

In any case, the search module 520 includes instructions that function to control the processor 500 to service queries generated by query producers. The query producers are, in one or more approaches, systems that are either automated or controlled via electronic user inputs to communicate search queries to the query system 340. Some examples of query producers include server systems, desktop computers, laptop computers, smartphones, or other computing system that can communicate queries.

When the search module 520 receives a query, the search module 520 queues the query for execution. In some embodiments, the search module 520 parses the received queries to determine the format and size of an expected response. Thus, after interacting with relevant distributed devices to generate a result, the search module 520 may also manage formatting and transmitting the result to the query producer as a response to the query.

The search module 520 further generates workloads as part of queries for communication to the distributed devices, such as an edge device. A workload includes query logic that can be executed by a target device from the distributed devices to filter results in the target device. A workload can additionally include program logic for combining and aggregating data. For example, a vehicle may store raw data, including a forward camera feed and speedometer data over time, among other data. An example workload may include instructions for the vehicle to produce a metadata list of time intervals in which the vehicle was moving faster than 25 miles per hour while humans were present in the front camera feed. The workload can include executable logic for the target device to combine raw data sets to produce and store a new metadata set. In some embodiments, the request also includes logic to access, format, and store additional datasets. As one example, the logic of the request may include a dataset listing waveforms of sounds that the target device is to identify from stored onboard audio recordings.

While the index 540 is described as including metadata about the distributed devices that are organized into a particular form for efficient searching, the index 540 may also include an object model file (or other formatted data) for separate ones of the distributed devices. In an example of target devices that are vehicles, the object model may be referred to as a "vehicle object model" (VOM). The object model file describe capabilities of an individual vehicle, and may include a list of sensors of the vehicle, an operating system, including particular versions, and information about memory space and processing capabilities of onboard systems. In some embodiments, the object models also function as application programming interfaces (APIs) for the distributed devices. For example, a request may specify a particular sensor, such as a front camera. The object model for the vehicle can translate the request into specific information relevant to the particular type of front camera (e.g., different front camera types and interfaces on different car makes and models).

The search module 520 identifies target devices to which a request, which may include a workload, will be sent for generating a response to a query. Since data is produced, stored, and processed at edge devices, the search module 520 determines which target devices are most likely to have the relevant data and processing capabilities for producing the query response. Responsive to a query, the search module 520 identifies a set of relevant target devices, the search module 520, in one approach, compares the data types specified by a query with sensors that are available and/or related data that is available for target devices as may be defined at least in part by the object models. The search module 520 may also assess the processing capabilities, memory space, and available timeframes for execution of a target device to determine if the target device will be able to execute the request for the query. Thus, in addition to searching the index 540 for matching metadata, the search module 520 also considers other factors, such as capabilities of the target devices when assessing how to proceed with the query.

The search module 520, upon assessing the distributed devices and identifying relevant target devices therefrom, communicates with the target devices. The requests generally function to induce the target devices to perform the query, which may include executing the logic included with the request at the target device to, for example, determine the presence of the selected data at the target device, extract the selected data, package the selected data, and communicate the selected data back to the query system 340. The search module 520 may further combine the selected data received from multiple different target devices into a response to the search query. For example, although route data received from one vehicle may be enough to map a street, route data received from hundreds of vehicles may be combined to produce a city map of the most used streets in the city in a day. Once the results of the executed query are received and aggregated, the search module 520 may communicate the response to the query producer that submitted the query.

Examples of sensors that might be included in a distributed device include but are not limited to: cameras, speedometers, clocks, thermometers, pressure gauges, accelerometers, positioning systems, vibration detectors, light detectors, LiDAR, radar, etc. In some embodiments, the collection system 170 may control the synchronization of certain information with other systems. For example, the collection system 170 may keep an accurate time to track other sensor data at a high resolution (e.g., to correlate when a bump was detected with a frame of recorded video). Time coherency not only helps with correlating sensors within a single target device but also with correlating data recorded and processed by collection systems 170. The collection system 170 may use network time protocol (NTP) or peer-to-peer protocols and systems to achieve time synchronizations.

The data collected and generated by sensors on the distributed devices is stored in a raw data store that may be part of the collection system 170 at an edge device. As one example, a query may focus on data that is associated with a particular geographic location. The geographic location may be defined according to a set of geographic coordinates, a geographic boundary, a business, and a landmark. The metadata describes locations traveled by vehicles within a previous interval of time. The target devices were located at or within a threshold distance of the identified geographic location within a previous interval of time. The geographic location information may be selected or correlated with weather information at the geographic location, and other temporal attributes of the location for a specified time. As a further example, the query may specify particular configurations of data, such as image data of an environment of a vehicle while the vehicle was at or within a threshold distance of the geographic location, temperature data while the vehicle was at or within the threshold distance of the geographic location, and moisture data associated with the vehicle while the vehicle was at or within the threshold distance of the geographic location.

As an additional example, when specifying a geographic location, the query may further indicate a particular type of data, including a particular type of content, such as captured images of an object, person, event, or environment associated with the identified geographic location. Additionally, the query can specify additional environmental characteristics when indicating a geographic location, such as traffic data associated with the identified geographic location.

In relation to specific sensor data, the query can identify various aspects about the specific sensor data for searching, such as attributes of images. For example, the query can specify a minimum resolution, a minimum frame rate, and so on. Similarly, the query can specify attributes related to three-dimensional sensor data, such as resolution (e.g., a number of scan lines), provided depth, etc. In a further aspect, the query specifies an interval of time during which a particular type of sensor has been captured. Thus, the search module 520 searches the index 540 according to the type of sensor or, similarly, the type of sensor data and further identifies whether the sensor was active during the defined time interval in order to select target devices. In yet a further aspect, the query may specify a threshold or average for particular sensor data over a defined period of time. For example, the query may specify an average radar value over a defined period of time, a peak radar return value over a defined time, and so on. Similarly, the query may indicate that matching data is to be sampled according to a timelapse (e.g., images every 1 second) over a defined period of time as opposed to providing all available content.

As previously noted, the collection system 170 acquires the sensor data 240, which includes telematics data of an associated vehicle. Accordingly, the metadata of the index 540 also reflects the telematics data. Thus, the index 540 further identifies general operating information about a vehicle, such as a vehicle operating mode, a vehicle speed, a vehicle fuel efficiency, a time of vehicle operation, and a location of vehicle operation. It should be appreciated that the operating mode may include various different modes depending on the type of vehicle, but generally encompasses autonomous operation, semi-autonomous operation, manual operation, and so on. In relation to electric or hybrid vehicles, the operating mode may indicate a performance mode, an eco mode, etc. Thus, because the index 540 generally correlates the metadata temporally to events, such as activation, deactivation, modification, etc., the query can leverage the index 540 to determine information from when different modes are active or not. In still a further example, the index 540 specifies additional information about the vehicle, such as a type of vehicle, a load hauled by the vehicle, equipment of the vehicle, a type of engine, software of the vehicle, vehicle capabilities, etc. It should be appreciated that at least some of this information may be included as a make/model/year indicator, while further aspects may be explicitly identified.

Moreover, the index 540 may further include metadata about specific events associated with vehicles. For example, a vehicle may include various crash detection sensors for deploying airbags. Additionally, other sensors, such as IMUs, may also provide sensing crashes or other events according to the characteristics of sensed accelerations. Thus, the index 540 can also indicate occurrences of the noted events. As such, the query may specify a vehicle crash, a vehicle malfunction (e.g., OBD fault codes), or another vehicle incident that is logged via the telematics data.

As still a further example of information that the query system 340 may search via the index 540, consider that the index 540 can provide indications of different behaviors. For example, the index 540 can include information about or direct derivations indicating driver behavior, vehicle behavior, and so on. In one example, the index includes explicit measures of distraction of a driver while operating the vehicle. The measures may be in the form of specific annotations according to a score or scale. In yet further examples, the distraction is embodied in sensor values, such as observed reaction times of the vehicle driver. The index 540 may further indicate driver skill through derived information that is stored in the index 540.

To further quantify the behaviors of the driver, the index 540 can specify a measure of interaction by the vehicle driver with an interface of the vehicle, actions taken by the vehicle driver when operating the vehicle (e.g., interactions with devices, movements, etc.), iterations of a behavior within a defined time, and so on. Of course, while specific actions or combinations of actions are highlighted, the query system 340 can execute the query relative to various combinations of information included in the index 540, such as the presence of various objects, conditions, etc., corresponding to the noted behaviors. In general, the query system 340 can handle a robust assortment of different queries that can combine many different tuples of parameters to specifically identify information that is of interest and, thus, provide for extracting only information that is relevant to the requestor that provided the query. In this way, the query system 340 can facilitate avoiding difficulties with offloading the vast amount of collected data from distributed devices and instead focus the offload on information that is of specific interest.

Figure 6:
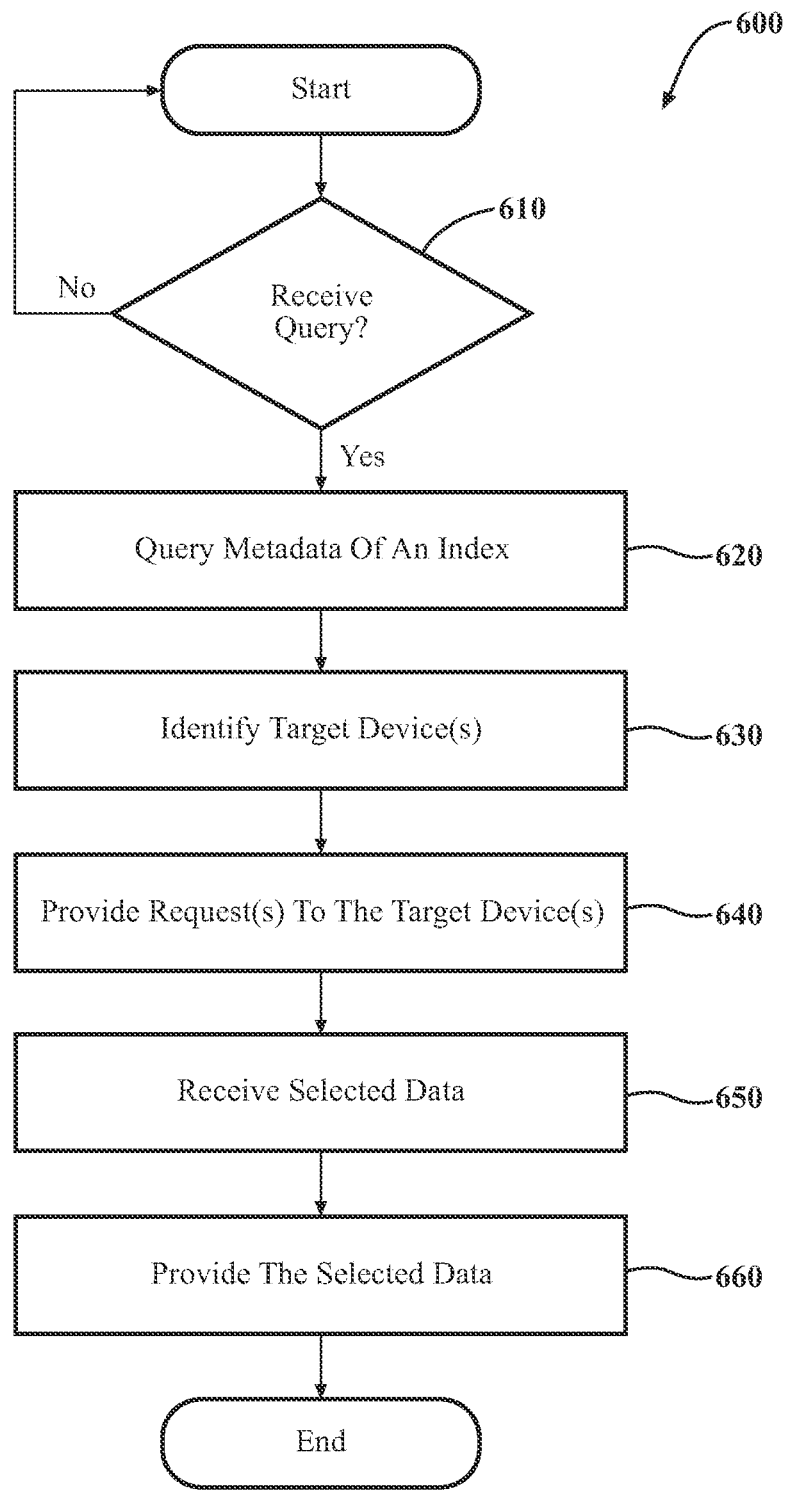
FIG. 6 is a flowchart illustrating one embodiment of a method associated with querying distributed devices for stored data.

Additional aspects about querying distributed data will be described in relation to FIG. 6. FIG. 6 illustrates a flowchart of a method 600 that is associated with querying distributed data using a common index. Method 600 will be discussed from the perspective of the query system 340 of FIG. 5 as implemented within a cloud-computing context. While method 600 is discussed in combination with the query system 340, it should be appreciated that the method 600 is not limited to being implemented within the query system 340 but is instead one example of a system that may implement the method 600. Furthermore, while the method is illustrated as a generally serial process, various aspects of the method 600 can execute in parallel to perform the noted functions.

At 610, the search module 520 monitors for a query. In general, the search module 520 monitors for queries that are provided by various requestors. Thus, the queries may be provided via a communication pathway, such as a computer network that is either wired or wireless. In any case, the search module 520 receives the request, which then induces searching and acquisition of the selected data when available.

At 620, the search module 520 queries metadata stored in the index 540. As noted previously, the metadata describes vehicle data stored by the distributed devices. Thus, the index 540 provides for determining whether any distributed devices that contribute to the index 540 store the selected data. In general, the query specifies the contents of the selected data and attributes of the selected data. As outlined previously, the query may specify many different aspects of the data stored at the collection systems 170. Accordingly, the form of the query itself can be robust to handle this. In particular, the query specifies attributes of the data, relationships between elements in the data, and/or specific derivations from the data. The query may further include program logic that operates on the metadata of the index to determine the attributes for the search or at the collection system 170 over the actual data to identify the data itself. Thus, the search module 520 provides access to the index 540, which organizes information about the stored data of the distributed devices by a geographic location of where the sensor data was acquired and a time of when the sensor data was acquired.

At 630, the search module 520 identifies target device(s) of the distributed devices that match the query. In one approach, the search module 520 identifies the selected data and then uses the index 540 to identify target devices associated with the selected data. That is, in general, the index 540 functions to associate the metadata stored therein with the specific devices in order to facilitate identifying the devices. The identification can include providing a name, address, or other information that the search module 520 can subsequently use to electronically communicate with the device.

At 640, the search module 520 provides request(s) to the target device(s) to cause the target device(s) to retrieve the selected data stored locally. In general, the search module 520 communicates with the collection system 170 of an associated target device to provide the request that includes the query. In one or more arrangements, the search module 520 may repackage the query into the request a workload for the collection system 170, which may include additional requests for other searches. Moreover, the search module 520 can further generate the request to include the noted program logic for execution at the collection system 170 as part of the search. Thus, the request broadly functions to control the collection system 170 of the target device(s) to identify and validate that locally stored data is the selected data as requested by the query.

At 650, the search module 520 receives the selected data from the target device(s). In one arrangement, the search module 520 receives the selected data from the target device(s) as segments of the stored data from the target device. That is, the collection system 170 extracts the segments from the stored data according to the request, which may include various modifications to the data. For example, as previously outlined, the query may specify that the selected data be provided as a timelapse, an average, and so on. Thus, in addition to removing irrelevant data, the collection system 170 may also refine the selected data into a format that is specified by the query.

At 660, the search module 520 provides the selected data as an electronic output. In one arrangement, the search module 520 displays the selected data visually on an electronic display. Additionally, or alternatively, the search module 520 communicates the selected data to the requestor. In further approaches, the search module 520 may use the selected data to produce additional derived outputs, such as the quality of roadways, traffic patterns in an area, likelihoods of accidents at different geographic locations, occurrences of distracted driving or other driver behaviors at particular locations and so on. The query system 340 can then leverage the derived determinations to improve the functioning of vehicle systems, such as autonomous systems that navigate problematic locations, navigation systems for rerouting, and so on. Overall, however, the combination of the collection system 170 and the query system 340 function to improve the handling of large amounts of data produced by vehicles and other distributed systems by avoiding the offload of the data while still making the data available for various purposes.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the collection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, and/or the automated driving module(s) 160 may control some or all of these vehicle systems 140 and, thus, may be partially or fully autonomous.

The processor(s) 110, and/or the automated driving module(s) 160 can be operatively connected to communicate with the various vehicle systems 140 and/or individual components thereof. For example, returning to FIG. 1, the processor(s) 110, the collection system 170, and/or the automated driving module(s) 160 can be in communication to send and/or receive information from the various vehicle systems 140 to control the movement, speed, maneuvering, heading, direction, etc. of the vehicle 100. The processor(s) 110, the collection system 170, and/or the automated driving module(s) 160 may control some or all of these vehicle systems 140.

The processor(s) 110, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the automated driving module(s) 160 can control the direction and/or speed of the vehicle 100. The processor(s) 110, and/or the automated driving module (s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor (s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, obstacles, or other environmental features, including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160, either independently or in combination with the collection system 170 and/or the query system 340, can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof

What is claimed is:

1. A query system, comprising:
one or more processors; and
a memory communicably coupled to the one or more processors and storing instructions that, when executed by the one or more processors, cause the one or more processors to:
responsive to receiving a query for selected data stored among one or more distributed devices, identify at least one target device of the distributed devices that matches the selected data using an index of vehicle data stored on the distributed devices;
provide a request to the at least one target device to cause the at least one target device to retrieve the selected data stored locally at the target device, including instructions to communicate instructions that cause the target device to search stored data for the selected data, and, in response to identifying the selected data, transmit the selected data without additional data from the stored data;
receive the selected data from the target device that is a remote vehicle; and
provide the selected data as an electronic output to adapt functioning of the remote vehicle according to driving behaviors derived from the selected data.

2. The query system of claim 1, wherein the instructions to identify the at least one target device include instructions to query metadata stored in the index describing the vehicle data stored by the distributed devices without querying the vehicle data directly, and
wherein the vehicle data includes sensor data and telematics data of reporting vehicles described by the metadata, the sensor data including at least images.

3. The query system of claim 1, wherein the instructions to identify the target device include instructions to query the index for information selected from a group including a vehicle behavior, a geographic location, a time, content of sensor data, and a vehicle state indicating a scenario associated with a combination of objects, locations of the objects, and a roadway context.

4. The query system of claim 1, wherein the query specifies contents of the selected data and attributes of the selected data including a quality of sensor data depicting the contents.

5. The query system of claim 1, wherein the instructions to receive the selected data from the target device include instructions to receive a segment of stored data from the target device that is extracted from the stored data according to characteristics from the query indicating metadata about the selected data.

6. The query system of claim 1, wherein the instructions to provide the selected data include instructions to adapt the functioning of the remote vehicle by performing one or more of adapting navigation of a location associated with the selected data by altering a trajectory of the remote vehicle and re-routing the remote vehicle at the location.

7. The query system of claim 1, wherein the index includes derived data that characterizes stored data of the distributed devices, including content of sensor data and relationships between objects depicted in the sensor data with one of the distributed devices that captured the sensor data, and
wherein the index organizes the stored data of the distributed devices by at least a geographic location of where the sensor data was acquired and a time of when the sensor data was acquired.

8. The query system of claim 1, wherein the distributed devices are one or more of vehicles and edge devices.

9. A non-transitory computer-readable medium storing instructions that, when executed by one or more processors, cause the one or more processors to:
responsive to receiving a query for selected data stored among one or more distributed devices, identify at least one target device of the distributed devices that matches the selected data using an index of vehicle data stored on the distributed devices;
provide a request to the at least one target device to cause the at least one target device to retrieve the selected data stored locally at the target device, including instructions to communicate instructions that cause the target device to search stored data for the selected data, and, in response to identifying the selected data, transmit the selected data without additional data from the stored data;
receive the selected data from the target device that is a remote vehicle; and
provide the selected data as an electronic output to adapt functioning of the remote vehicle according to driving behaviors derived from the selected data.

10. The non-transitory computer-readable medium of claim 9, wherein the instructions to identify the at least one target device include instructions to query metadata stored in the index describing the vehicle data stored by the distributed devices without querying the vehicle data directly, and
wherein the vehicle data includes sensor data and telematics data of reporting vehicles described by the metadata, the sensor data including at least images.

11. The non-transitory computer-readable medium of claim 9, wherein the instructions to identify the target device include instructions to query the index for information selected from a group including a vehicle behavior, a geographic location, a time, content of sensor data, and a vehicle state indicating a scenario associated with a combination of objects, locations of the objects, and a roadway context.

12. The non-transitory computer-readable medium of claim 9, wherein the query specifies contents of the selected data and attributes of the selected data including a quality of sensor data depicting the contents.

13. The non-transitory computer-readable medium of claim 9, wherein the instructions to receive the selected data from the target device include instructions to receive a segment of stored data from the target device that is extracted from the stored data according to characteristics from the query indicating metadata about the selected data.

14. A method, comprising:
responsive to receiving a query for selected data stored among one or more distributed devices, identifying, by a query device, at least one target device of the distributed devices that matches the selected data using an index of vehicle data stored on the distributed devices;
providing, by the query device, a request to the at least one target device to cause the at least one target device to retrieve the selected data stored locally at the target device, including communicating instructions that cause the target device to search stored data for the selected data, and, in response to identifying the selected data, transmitting the selected data without additional data from the stored data;
receiving, by the query device, the selected data from the target device that is a remote vehicle; and
providing the selected data as an electronic output to at least adapt functioning of the remote vehicle according to driving behaviors derived from the selected data.

15. The method of claim 14, wherein identifying the at least one target device includes querying metadata stored in the index describing the vehicle data stored by the distributed devices without querying the vehicle data directly, and wherein the vehicle data includes sensor data and telematics data of reporting vehicles described by the metadata, the sensor data including at least images.

16. The method of claim 14, wherein identifying the target device includes querying the index for information selected from a group including a vehicle behavior, a geographic location, a time, content of sensor data, and a vehicle state indicating a scenario associated with a combination of objects, locations of the objects, and a roadway context.

17. The method of claim 14, wherein the query specifies contents of the selected data and attributes of the selected data including a quality of sensor data depicting the contents.

18. The method of claim 14, wherein receiving, by the query device, the selected data from the target device includes receiving a segment of stored data from the target device that is extracted from the stored data according to characteristics from the query indicating metadata about the selected data.

19. The method of claim 14, wherein providing the selected data to adapt the functioning of the remote vehicle includes one or more of adapt navigation of a location associated with the selected data by altering a trajectory of the remote vehicle and re-routing the remote vehicle at the location.

20. The method of claim 14, wherein the index includes derived data that characterizes stored data of the distributed devices, including content of sensor data and relationships between objects depicted in the sensor data with one of the distributed devices that captured the sensor data, and
wherein the index organizes the stored data of the distributed devices by at least a geographic location of where the sensor data was acquired and a time of when the sensor data was acquired.

* * * * *